June 1, 1965  K. L. KIMREY ETAL  3,186,321
EXPOSED FILM MAGAZINES FOR PERIODIC CAMERAS
Filed Nov. 29, 1961  2 Sheets-Sheet 1

INVENTORS
Kenneth L. Kimrey
Robert L. Dintaman
By
ATTORNEY

June 1, 1965                K. L. KIMREY ETAL                3,186,321
                  EXPOSED FILM MAGAZINES FOR PERIODIC CAMERAS
Filed Nov. 29, 1961                                        2 Sheets-Sheet 2
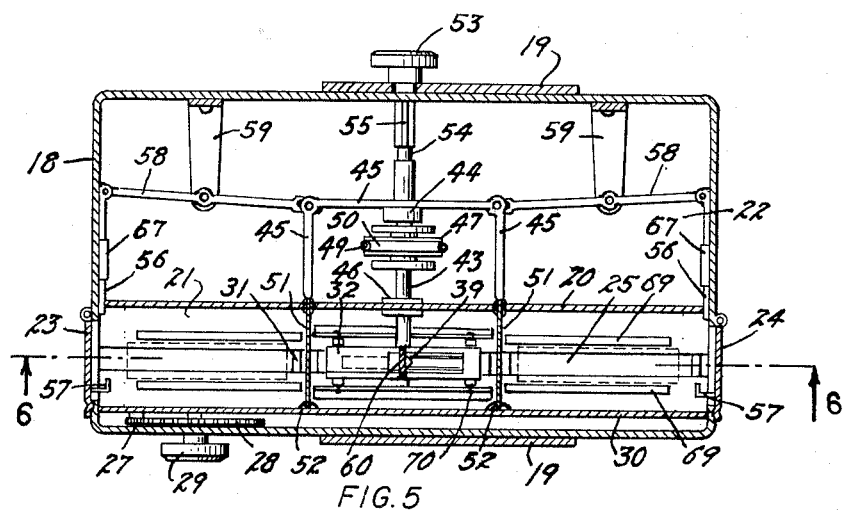
FIG. 5
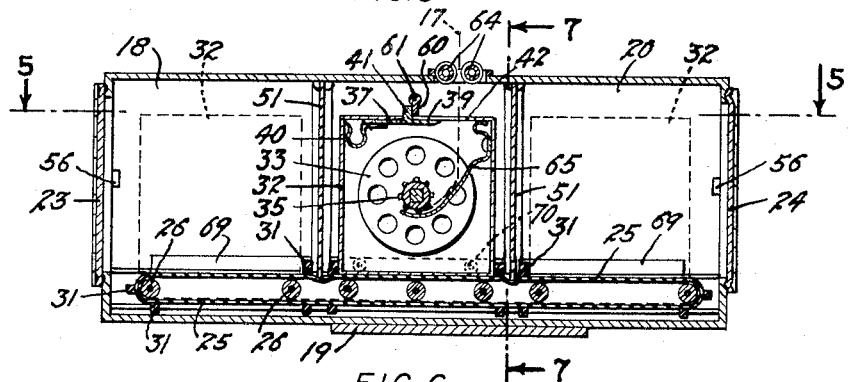
FIG. 6
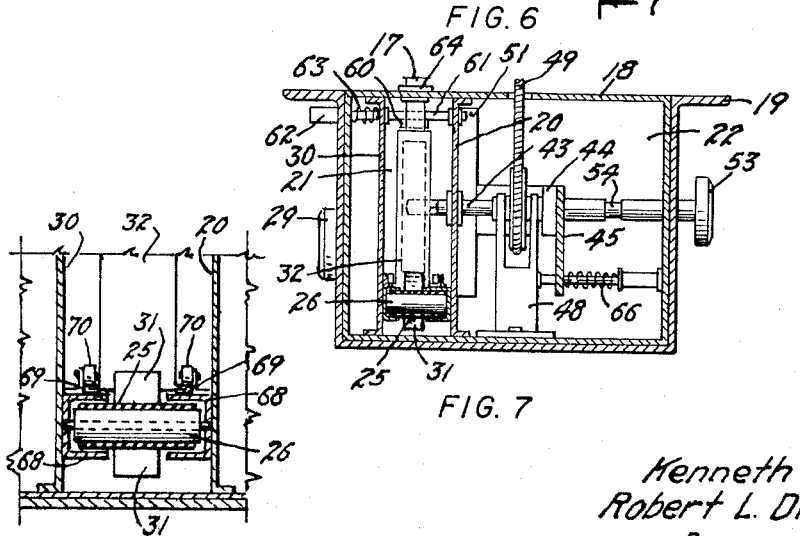
FIG. 7
FIG. 8
INVENTORS
Kenneth L. Kimrey
Robert L. Dintaman
BY
ATTORNEY

United States Patent Office 3,186,321
Patented June 1, 1965

3,186,321
EXPOSED FILM MAGAZINES FOR PERIODIC CAMERAS
Kenneth L. Kimrey, 508 Tucson, and Robert L. Dintaman, 410 Lansing, both of Aurora, Colo.
Filed Nov. 29, 1961, Ser. No. 155,606
7 Claims. (Cl. 95—31)

This invention relates to a periodic camera, that is, to a camera of the type designed to continuously take, pictures on a roll of film at preset time intervals. Such cameras are used for many purposes such as photographing the progress of construction jobs, photographing cashiers' customers, and photographing the aisles and counters in merchandising establishments to detect shop lifting and other criminal activities.

The film in such cameras is usually inaccessible until the complete film roll has been exposed, and since this may require many hours, and in some cases days, access to the film record can only be conveniently had at relatively long intervals.

Emergencies may arise when the study of a picture would be instantly desirable. In such cases, the camera must be stopped, the film removed and replaced. This requires a considerable loss of time and film and since no pictures can be taken during the interval required for removing and replacing the film rolls, there is a possibility of losing a most desired picture which should have been taken during this inactive interval.

The principal object of this invention is to provide an attachable, exposed film receiving magazine for a periodic camera which will enable exposed portions of the film of a periodic camera to be quickly and easily removed at any time without interfering in any way with the normal periodic operation of the camera and without damage to the film.

A further object is to provide a periodic camera with exposed film receiving means whereby a days exposure can be removed at the close of each day without disturbing the camera or its film supply.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 5 is an enlarged horizontal section looking downwardly on the line 5—5, FIG. 6;

FIG. 6 is a vertical longitudinal section, taken on the line 6—6, FIG. 5;

FIG. 7 is a cross-section taken on the line 7—7, FIG. 5; and

FIG. 8 is a fragmentary enlargement of a portion of the section of FIG. 7.

Figure 1:
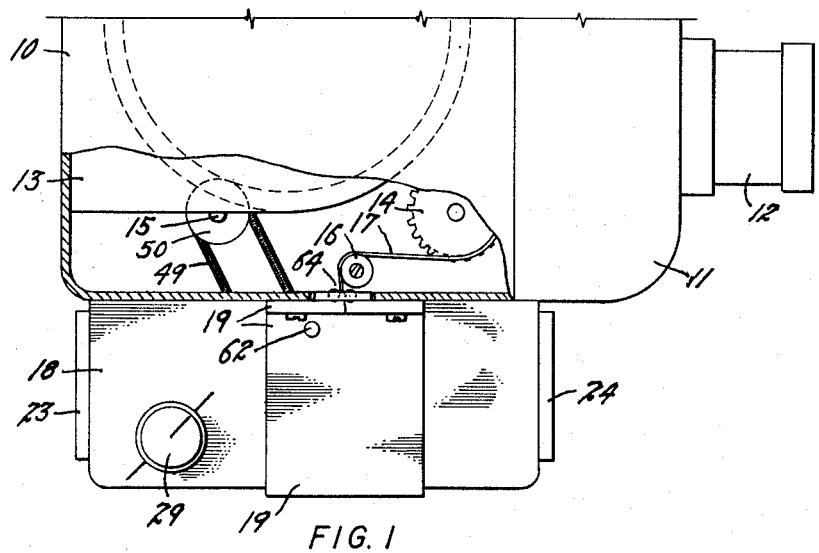
FIG. 1 is a fragmentary side elevational view of a conventional periodic camera, partially broken away to show pertinent internal structure, showing the improved exposed film receiving magazine applied thereto.
Figure 2:
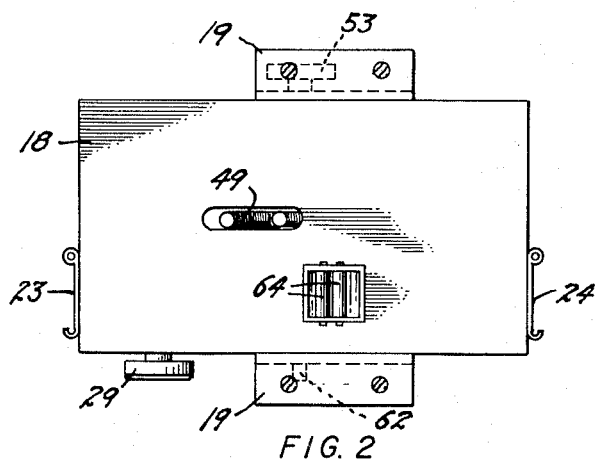
FIG. 2 is a top view of the exposed film magazine taken looking downwardly on the line 2—2, FIG. 1.

In FIG. 1 a conventional periodic camera box is indicated at 10 with its mechanism housing at 11, objective lens system at 12 and unexposed film compartment at 13. Such cameras are provided with a film advancing sprocket 14, a suitable drive shaft 15 and an exposed film roller 16 over which the exposed film, shown at 17, travels to a light-proof receiving spool which is replaced by the magazine of this invention. The details of the camera form no part of this invention. This improved magazine would operate on any camera from which a continuous strip of exposed film is discharged. The camera shown is simply indicative of the type.

The improved exposed film receiving magazine comprises a rectangular, enclosed magazine 18 which is supported against the camera 10 in any suitable manner such as through the medium of a U-shaped clamping bracket 19.

The magazine is divided by means of a longitudinally extending partition 20 into a canister compartment 21 and a mechanism compartment 22. The partition 20 forms one wall of the canister compartment. The other wall is formed by a wall plate 30 parallel to the partition 20. The canister compartment is closed at one extremity by means of an outwardly opening, spring-closed, hinged entrance door 23 and at the other extremity by a similar exit door 24. An endless flexible conveyor belt 25 extends throughout the length of the canister compartment over suitable belt rollers 26. One of the terminal rollers 26 is rotated from a pinion 27 which meshes with a drive gear 28 mounted on the shaft of an advance knob 29 in the exterior of the magazine. The ratio between the pinion 27 and the gear 28 is such that a 180° rotation of the knob 29 will cause the belt to travel forwardly ⅓ of its length. The belt 25 is divided into six canister receiving pockets by means of twelve uniformly spaced, cross cleats 31.

Figures 3, 4:
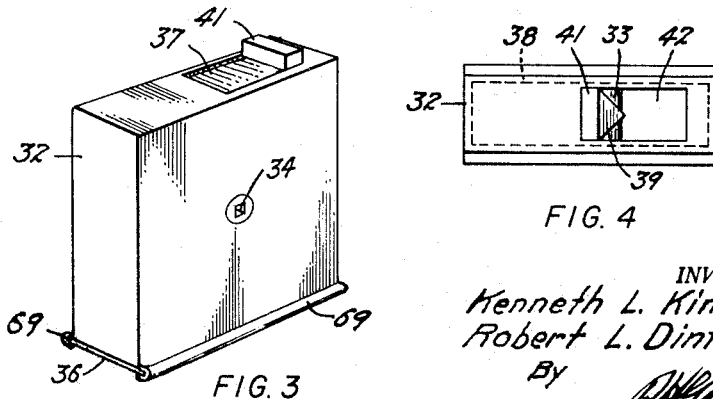
FIG. 3 is an enlarged perspective view of a film canister as employed in this invention illustrating the latter in the closed light-proof condition.
FIG. 4 is a top view of the canister of FIG. 3 illustrating the latter as it would appear in the improved magazine when received exposed film.

The canister receiving pockets on the belt are sized to receive film canisters 32, as illustrated in FIGS. 3 and 4. Each canister contains a film spool 33 having a square shaft-receiving hole 34 in its hub and provided with film sprocket teeth 35 on the hub surface. The hub is rotatably mounted in the two side walls of the canister. The bottom of the canister is closed by a bottom slide plate 36 which allows access to a film would upon the hub between the sides of the spool 33. The slide plate slides in side flanges 69 formed at the bottom of the sides of the canister.

The top of each canister is provided with a film entrance opening 42 which is normally closed by a sliding knife plate 37 which is slidable in guide grooves 38 in the top of the canister. The forward extremity of the knife plate 37 is preferably pointed, as shown at 39, to cut a film entering the canister before it completely closes the top of the latter. The knife plate 37 is constantly urged to the closed position by means of a leaf spring 40 and can be pulled rearwardly against the action of the spring 40, to open the canister by an upwardly projecting knife stop 41 mounted on the knife plate 37. A second leaf spring which will be herein designated as a film guide spring 65 is mounted on the end of the canister and curves inwardly to resiliently engage the hub of the spool 33. If a strip of film, of the motion picture type provided with sprocket holes, be forced downwardly through the open entrance opening 42, it will be resiliently urged toward the hub of the spool 33 by the film guide spring 65 to engage the sprocket teeth 35 thereon so that if the spool be rotated in a clockwise direction, the film will be wound upon the spool.

The belt 25 has a length to receive three canisters upon its upper reach, to wit, an empty canister, as shown at the left in FIG. 6; an operating canister, as shown in the middle of FIG. 6; and a filled canister, as shown at the right position, the square hole 34 in its hub will be in alignment with a withdrawable spool shaft 43 so that the latter can be forced into the hub to impart rotation to the spool 33.

The spool shaft 43 is journalled in a bifurcated pillow block 48 in the mechanism compartment 22 and terminates at its outer extremity in a thrust bearing 44 mounted on a shiftable U-shaped yoke 45. The inner extremity of the shaft 43 slidably extends through a slide bearing 46 in the partition 20. A belt sheave 47 is positioned between the furcations of the pillow block and is splined upon the shaft so that the sheave will rotate the shaft yet allow the latter to shift longitudinally therein. Rotation is imparted to the sheave 47 through the medium of a flexible drive belt 49 extending to any convenient rotating element in the camera box 10, such as to a drive sheave 50 on the drive shaft 15 of the camera.

A vertical light barrier plate 51 is slidable through a light sealed slot in the partition 20 and seats against a light sealing cushion 52 at each side of the active middle canister. The barrier plates seal against the side walls and top of the canister compartment and against the belt 25 to completely seal the active canister from the entrance of light.

Each extremity of the U-shaped yoke 45 is fixedly connected to one of the barrier plates 51 so that when the yoke 45 is shifted away from the partition 20 to withdraw the spool shaft 43 from the film spool 33, the yoke will withdraw the barrier plates from the canister compartment 21.

The yoke 45 is shifted between the outer or inoperative position and the inner or operative position by means of a shift knob 53 on the exterior of the magazine. The shift knob 53 is mounted on a stem 54 affixed to and extending from the yoke in axial alignment with the spool shaft 43 so that outward movement of the knob 53 will withdraw the spool shaft 43 from the operative film spool and open the light barrier plates 51 and inward movement will reverse the procedure. Means are preferably provided for latching the stem in its extreme positions such as by providing a longitudinal key 55 which can be rotated into and out of engagement with a key notch in the wall of the magazine.

It is desirable that the doors 23 and 24 be prevented from opening when the magazine is in operation to prevent accidental entrance of light. This is accomplished by mounting sliding latch bolts 56 in latch guide sleeves 67 on the end walls of the mechanism compartment so positioned that when projected forwardly, they will engage hooked keepers 57 on the doors to prevent the latter from being opened. The latch bolts are shifted in consequence of the movements of the yoke 45 through the medium of swinging levers 58 which are pivotally supported from the magazine as indicated at 59 and connect with the yoke 45 at their inner extremities and with the latch bolts 56 at their outer extremities.

The knife plate 37 on each canister will be automatically pulled back to open the entrance opening 42 of that canister as it enters the medial or active position through the medium of a stop flap 60 which extends downwardly from a push button shaft 61 extending across the canister compartment above the medial position of the canister. As each canister approaches its active position its knife stop 41 will contact the stop flap and be held stationary while the canister continues to travel so as to open the film entrance opening 42 of that canister. The push button shaft terminates in a push button 62 on the exterior of the magazine which is constantly urged outwardly by a push button spring 63 surrounding the shaft 61. Pressure on the button 62 moves the stop flap 60 inwardly from the path of the knife stop 41 to release the latter to allow the spring 40 to snap the knife plate 37 closed.

*Operation*

Let us assume that an empty canister is at the left position of FIG. 6 and that an active canister is in the medial position with its knife plate 37 held open by the stop flap 60. The film 17 is feeding intermittently downward from the camera between entrance rollers 64 in the top of the magazine and the film is being wound on the film spool 33 by the frictional urge imparted by the belt 49.

Now let us assume it is desired to remove the exposed film for development. The operator simply depresses the press button 62 to release the knife plate. The spring 40 snaps the knife plate closed so as to cut the film and seal the canister. The shift knob is now pulled outwardly to withdraw the spool shaft 43 from the spool and to withdraw the barrier plates 51 from the canister compartment. The latter movement also withdraws the latch bolts 56 to unlock the doors 23 and 24.

The advance knob 29 is now rotated clockwise 180° which will move the empty canister to the medial position and the exposed canister to the "right" position. The door 23 is now opened and a new empty canister is placed in the "left" position and the door 24 is opened to remove the exposed canister for development. The shift knob 53 is now forced inwardly to connect the drive shaft to the spool of the medial empty canister and to close the barrier plates 51 and lock the doors 23 and 24. The film continues downwardly onto the spool in the new canister without the loss of a single exposure during the change over.

The conveyor belt 25 and its rollers 26 can be mounted between the partition 20 and the wall plate 30 in any desired manner. As illustrated, the rollers are mounted in two channel track members 68 secured in spaced-apart relation to the partition 20 and the wall plate 30, respectively. Two open sides of the channel track members 68 face each other as shown in FIG. 8 and the belt rollers 26 are journalled therein and extend therebetween.

The channel track members extend over the two sides of the belt 25 and the cross cleats 31 extend upwardly and downwardly from between the track members 68 to engage the canisters and slide them along the top sides of the track members.

Spaced canister guide strips 69 are mounted on the top sides of the track members to guide the canisters in a straight line therealong.

To prevent the canisters from tilting when their knife stops 41 engage the stop flap 60, the guide strips 69 in middle position are provided with hold down rollers 70 which ride on the bottom flanges 71 of the canisters to maintain the latter in frictional engagement with the channel track members 68, as shown in FIG. 8.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. An exposed film receiving magazine for a periodic camera comprising:
 (a) a completely enclosed, light-tight magazine positioned to continuously receive a strip of exposed film from said camera;
 (b) a removable canister in and completely enclosed by said magazine;
 (c) a driven film winding spool positioned in said canister so as to receive said film from said magazine through an entrance opening in said canister;
 (d) a knife plate movably mounted on said canister to simultaneously cut the film and close said entrance opening;
 (e) spring means urging said knife plate toward the closed cutting position;
 (f) and stop means releasable from the exterior of said housing for releasing said knife plate to the action of said spring means to sever the film and close said entrance opening to seal the canister for removal from said magazine.

2. An exposed film receiving magazine for a periodic camera as described in claim 1 having:
   (a) a second canister aligned with and in the plane of the first canister within said magazine;
   (b) means operable from the exterior of said magazine to move a second similar canister into the film receiving position to replace the first canister, the knife plate on the second canister being positioned to contact said stop means as it moves into the film receiving position to retract the knife plate thereon against the bias of said spring to open the entrance opening in the second canister.

3. An exposed film receiving magazine for a periodic camera as described in claim 2 having:
   (a) an elongated canister compartment in said magazine, said canisters being positioned in alignment in said compartment;
   (b) a movable barrier plate positioned at each side of the film receiving position in said canister compartment;
   (c) and means connected with and operable from the exterior of said magazine for closing said barrier plates transversely across said canister compartment at each side of a canister in the film receiving position to seal off the entrance of light.

4. An exposed film receiving magazine for a periodic camera as described in claim 3 having:
   (a) drive means for said film spool, said drive means being disconnectable in consequence of the removal of said barrier plates.

5. An exposed film receiving magazine for a periodic camera comprising:
   (a) a magazine positioned to continuously receive a strip of exposed film from said camera;
   (b) an elongated canister compartment in said magazine;
   (c) an entrance door at one extremity of said compartment;
   (d) an exit door at the other extremity of said compartment;
   (e) an endless, cleated belt forming the floor in said canister compartment and extending from said entrance door to said exit door, said belt having sufficient length to form three canister pockets between the cleats on its upper reach;
   (f) a first film canister resting in the middle pocket of the upper reach;
   (g) a film spool rotatably mounted in said canister so as to receive said film strip through an entrance opening in the top of said canister;
   (h) a spring actuated knife plate reciprocally mounted in the top of said canister and adapted when released to simultaneously cut said film strip and close said entrance opening;
   (i) a withdrawable spool shaft mounted in said housing and detachably engaging said film spool for rotating the latter;
   (j) a second empty canister resting in a pocket on the upper reach of said belt, said canister being a duplicate of the first canister;
   (k) means for withdrawing said spool shaft from said spool;
   (l) means for releasing said knife plate; and
   (m) means for imparting movement to said belt for smiultaneously moving the first canister from its medial position and replacing it with the second canister.

6. An exposed film receiving magazine for a camera as described in claim 5 having:
   (a) a slidable light barrier plate adapted to be slid across said canister compartment at each side of said middle pocket to seal off light therefrom; and
   (b) means operable from the exterior of said magazine for withdrawing said barrier plates from said canister compartment.

7. An exposed film receiving magazine for a camera as described in claim 6 having:
   (a) a latch bolt positioned to lock each door in the closed position; and
   (b) means for simultaneously releasing said latch bolts in consequence of the withdrawal of said spool shaft.

References Cited by the Examiner

UNITED STATES PATENTS 2,095,849 10/37 Wittel _____ 95—31

EVON C. BLUNK, *Primary Examiner.*

JAMES W. LOVE, *Examiner.*